(12) United States Patent
Balsiger

(10) Patent No.: US 11,092,224 B2
(45) Date of Patent: Aug. 17, 2021

(54) METHOD OF DEVELOPING SPLINE PROFILE

(71) Applicant: Hamilton Sundstrand Corporation, Charlotte, NC (US)

(72) Inventor: Derick S. Balsiger, Mayer, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 957 days.

(21) Appl. No.: 15/729,300

(22) Filed: Oct. 10, 2017

(65) Prior Publication Data

US 2019/0107188 A1   Apr. 11, 2019

(51) Int. Cl.
| | | |
|---|---|---|
| *F16H 1/32* | (2006.01) | |
| *F16H 49/00* | (2006.01) | |
| *G01D 5/04* | (2006.01) | |
| *F16C 19/06* | (2006.01) | |

(52) U.S. Cl.
CPC ............ *F16H 49/001* (2013.01); *F16C 19/06* (2013.01); *F16H 1/32* (2013.01); *G01D 5/04* (2013.01); *F16H 2049/003* (2013.01)

(58) Field of Classification Search
CPC ...... F16H 1/32; F16H 49/001; F16H 55/0833; F16C 19/06; G01D 5/04
USPC ......................................................... 74/640
See application file for complete search history.

(56) References Cited

U.S. PATENT DOCUMENTS

| | | | |
|---|---|---|---|
| 2,906,143 | A | 9/1959 | Walton |
| 5,456,139 | A | 10/1995 | Aubin |
| 5,662,008 | A | 9/1997 | Aubin et al. |
| 6,799,489 | B2 | 10/2004 | Ishikawa |
| 9,353,804 | B2 | 5/2016 | Balsiger et al. |
| 9,470,301 | B2 | 10/2016 | Kuo |
| 9,605,742 | B2 | 3/2017 | Lin |
| 2011/0207578 | A1 | 8/2011 | Lee et al. |
| 2012/0285283 | A1 | 11/2012 | Shoichi |
| 2017/0184190 | A1 | 6/2017 | Klassen |
| 2017/0198802 | A1 | 7/2017 | Kiyosawa et al. |

FOREIGN PATENT DOCUMENTS

| | | |
|---|---|---|
| EP | 0703385 A1 | 3/1996 |
| EP | 0767325 A2 | 4/1997 |
| JP | 2009156462 A | 7/2009 |

OTHER PUBLICATIONS

Search Report dated Mar. 4, 2019 in, EP Application No. EP 18188265.5, 10 pages.

*Primary Examiner* — William C Joyce
(74) *Attorney, Agent, or Firm* — Cantor Colburn LLP

(57) ABSTRACT

A method of developing a flex spline and circular gear tooth profile for a harmonic actuator is provided. The method includes defining circular gear and flex spline centroids based on gear ratio calculations, finding mid-points between the centroids of the circular gear and the centroids of the flex spline and transforming the mid-points into a mapping of the tooth profile for respective teeth of the circular gear and the flex spline.

16 Claims, 4 Drawing Sheets

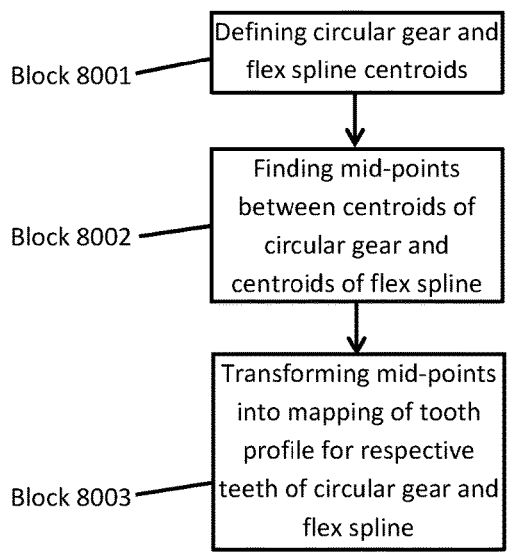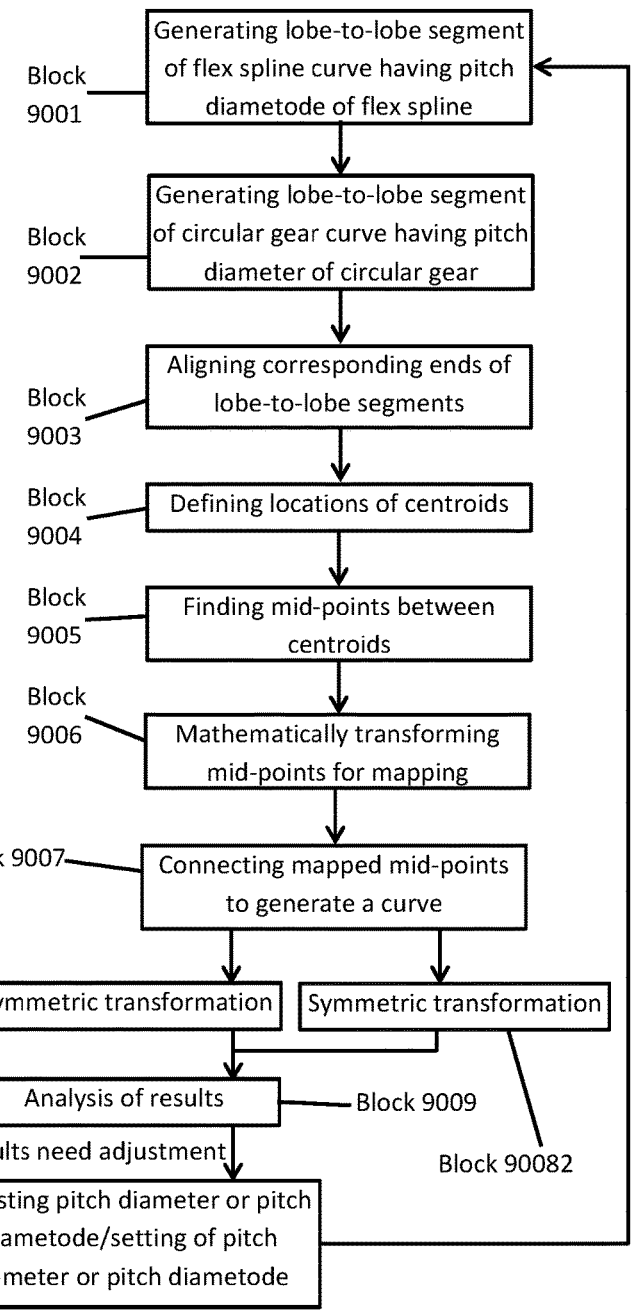

METHOD OF DEVELOPING SPLINE PROFILE

STATEMENT OF FEDERAL SUPPORT

This invention was made with government support under FA8650-15-C-2500 awarded by the United States Air Force. The government has certain rights in the invention.

BACKGROUND

The following description relates to an actuation system for an aircraft and, more specifically, to a method of developing spline profiles for a harmonic gear in a compound harmonic drive assembly of a rotary actuator.

A compound harmonic drive can reduce backlash in a motion-control system. A compound harmonic gear of a compound harmonic drive allows high reduction ratios with concentric shafts and relatively low backlash and vibration. The structure and operation of a harmonic gear are based upon a relatively simple construction using elasto-mechanical properties of metal.

The harmonic gear typically includes a wave generator, a flexible (flex) spline and a circular gear. The wave generator is an oval or elliptical cam with a thin bearing placed around an outer circumference thereof and is mounted onto a shaft of a motor. The flex spline is thin and made of elastic metal with external or internal teeth formed along an outer or inner circumference thereof. The circular gear is a rigid internal or external gear with internal or external teeth formed along an inner or outer circumference thereof. The circular gear has a different number of teeth than the flex spline and is attached to a gearbox along an inner or outer circumference thereof. The wave generator, the flex spline and the circular gear are co-axially aligned with respect to each other.

In operation, the wave generator is mounted on a drive shaft and rotatable such that it imparts a continuously moving elliptical form or wave-like motion to the flex spline. This causes a meshing of the teeth of the flex spline with the teeth of the circular gear at respective equidistant points of engagement or connection thereof to progress in a continuously rolling fashion. It also allows for full-teeth axial disengagement or disconnection at the points opposite a minor axis of the wave generator. A major axis of the flex spline actually rotates with the wave generator, so the points where the corresponding teeth mesh with each other revolve around a center point at a rate equal to that of the wave generator.

Since the flex spline has fewer teeth than the circular gear has teeth and the full-teeth axial disconnect is made possible by the ellipticity of the wave generator, each complete revolution of the wave generator causes a circumferential displacement of the flex spline in relation to the circular gear. This displacement is always in a direction opposite to that of the rotation of the wave generator. That is, if the wave generator is rotating in a clockwise direction, the displacement of the flex spline is in a counter-clockwise direction and vice versa. In this way, the compound harmonic drive is capable of functioning as a speed reducer.

In an aircraft system, for example, a rotary electromechanical actuator (rotary EMA) is implemented for ailerons, flaps, slats, spoilers and other flight-control surfaces as well as in actuation actions for engines. In this context, the compound harmonic drive is incorporated with the rotary EMA.

BRIEF DESCRIPTION

According to one aspect of the disclosure, a method of developing a flex spline and circular gear tooth profile for a harmonic actuator is provided. The method includes defining circular gear and flex spline centroids based on gear ratio calculations, finding mid-points between the centroids of the circular gear and the centroids of the flex spline and transforming the mid-points into a mapping of the tooth profile for respective teeth of the circular gear and the flex spline.

In accordance with additional or alternative embodiments, the gear ratio calculations are based on respective numbers of the teeth of the circular gear and the flex spline.

In accordance with additional or alternative embodiments, the transforming of the mid-points into the mapping of the tooth profile includes connecting the mid-points in the mapping to generate a curve.

In accordance with additional or alternative embodiments, the method further includes transforming the curve symmetrically.

According to another aspect of the disclosure, a method of developing a tooth profile for respective teeth of a flex spline and a circular gear of a harmonic actuator is provided. The method includes generating a lobe-to-lobe segment of a flex spline curve having a pitch diametode of the flex spline, generating a lobe-to-lobe segment of a circular gear curve having a pitch diameter of the circular gear, aligning corresponding ends of lobe-to-lobe segments of the flex spline curve and the circular gear curve, defining locations of centroids of each of the teeth of the flex spline and the circular gear along the lobe-to-lobe segments of the flex spline curve and the circular gear curve, respectively, and finding mid-points for mapping into the tooth profile between the locations of corresponding pairs of the centroids of each of the teeth of the flex spline and the circular gear.

In accordance with additional or alternative embodiments, respective numbers of the teeth of the flex spline and the circular gear are based on a number of flex spline lobes.

In accordance with additional or alternative embodiments, the method further includes analyzing results of a mapping of the found mid-points into the tooth profile, adjusting at least one of the pitch diametode of the flex spline and the pitch diameter of the circular gear and repeating the generating operations, the aligning operation, the defining operation and the finding operation.

In accordance with additional or alternative embodiments, the method further includes connecting a mapping of the found mid-points to generate a curve of the tooth profile.

In accordance with additional or alternative embodiments, the method further includes symmetrically transforming the curve.

In accordance with additional or alternative embodiments, the flex spline is operably disposable inside the circular gear and the method further includes setting the pitch diametode equal to the pitch diameter of the circular gear multiplied and divided by the numbers of teeth of the flex spline and the circular gear, respectively.

In accordance with additional or alternative embodiments, the flex spline is operably disposable outside the circular gear and the method further includes setting the pitch diametode equal to the pitch diameter of the circular gear multiplied and divided by the numbers of teeth of the circular gear and the flex spline, respectively.

According to yet another aspect of the disclosure, a harmonic actuator is provided and includes a circular gear having a pitch diameter and a first number of first teeth and a flex spline having a pitch diametode and a second number of second teeth which interface with the first number of the first teeth gear during rotational operations. The first and second numbers of the first and second teeth, respectively, are different, and each of the first and second teeth has a tooth profile which is developed based on a mapping of midpoints between locations of centroids of the first teeth along a circular gear curve having the pitch diameter and locations of centroids of the second teeth along a flex spline gear curve having the pitch diametode.

In accordance with additional or alternative embodiments, the first and second numbers are based on a number of flex spline lobes.

In accordance with additional or alternative embodiments, a plurality of the first teeth fit perfectly with a plurality of the second teeth.

In accordance with additional or alternative embodiments, a plurality of the first teeth fit with a plurality of the second teeth with a tolerance of $1/10,000$ of an inch.

In accordance with additional or alternative embodiments, the flex spline is operably disposable inside or outside the circular gear.

In accordance with additional or alternative embodiments, the pitch diametode is equal to the pitch diameter of the circular gear multiplied and divided by the second and first numbers, respectively, where the flex spline is operably disposable inside the circular gear.

In accordance with additional or alternative embodiments, the pitch diametode is equal to the pitch diameter of the circular gear multiplied and divided by the first and second numbers, respectively, where the flex spline is operably disposable outside the circular gear.

In accordance with additional or alternative embodiments, all of the first teeth fit perfectly with all of the second teeth.

In accordance with additional or alternative embodiments, all of the first teeth fit with all of the second teeth with a tolerance of $1/10,000$ of an inch.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 8 is a flow diagram illustrating a method of developing a flex spline and circular gear tooth profile for a harmonic actuator in accordance with embodiments;

FIG. 9 is a flow diagram illustrating a method of developing a tooth profile for respective teeth of a flex spline and a circular gear of a harmonic actuator in accordance with embodiments.

Figure 1:
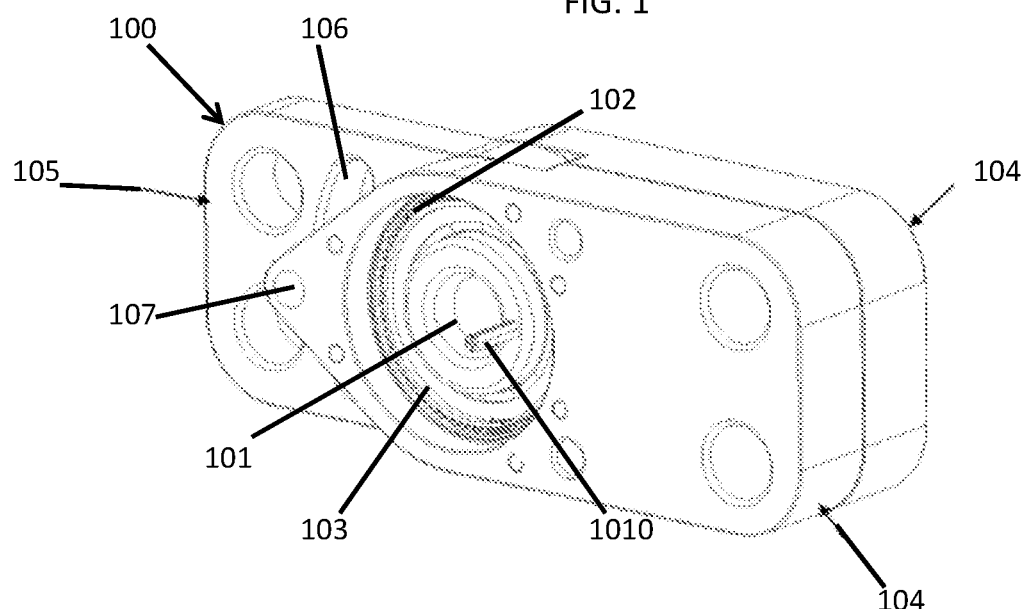
FIG. 1 is a perspective view of a compound harmonic actuator in accordance with embodiments.
Figure 2:
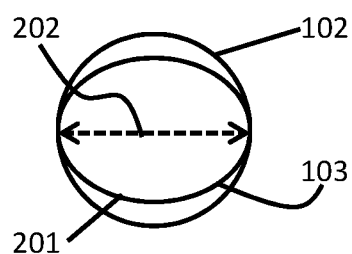
FIG. 2 is a schematic axial view of a wave generator of the compound harmonic actuator of FIG. 1 in accordance with alternative embodiments.
Figure 3:
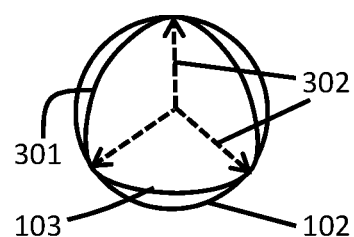
FIG. 3 is a schematic axial view of a wave generator of the compound harmonic actuator of FIG. 1 in accordance with alternative embodiments.
Figure 4:
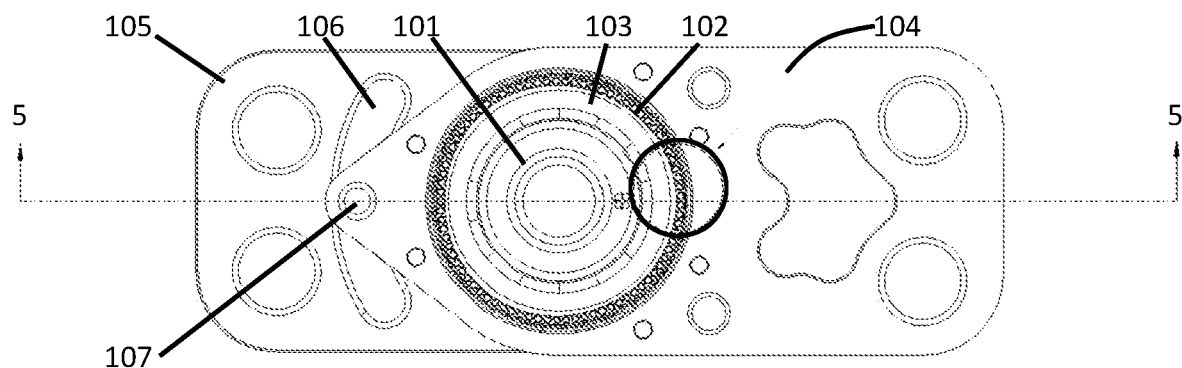
FIG. 4 is a top-down view of the compound harmonic actuator of FIG. 1.
Figure 5:
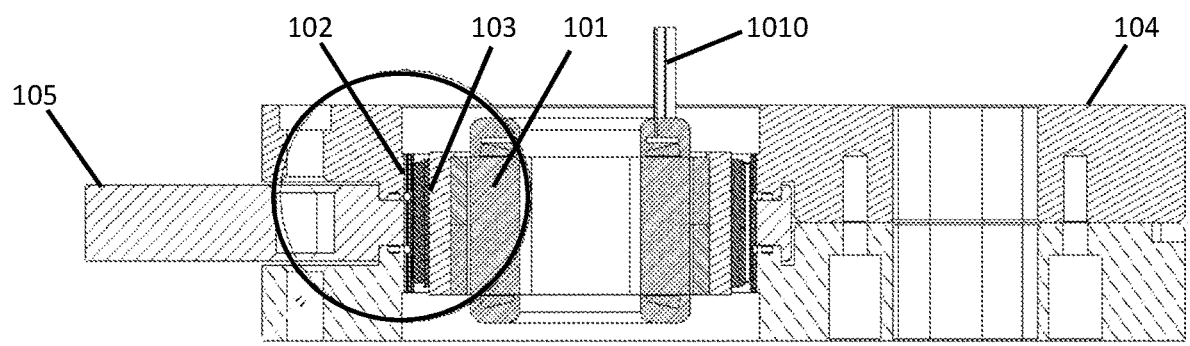
FIG. 5 is a cutaway side view of the compound harmonic actuator of FIG. 1 taken along line 5-5 of FIG. 4.
Figure 6:
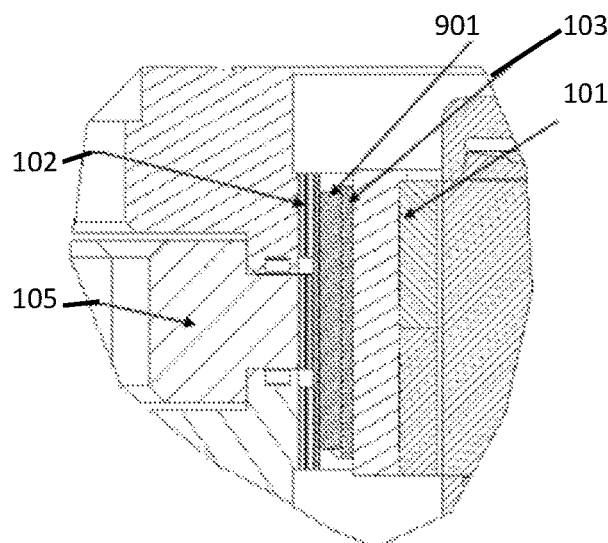
FIG. 6 is an enlarged view of the encircled portion of FIG. 5.
Figure 7:
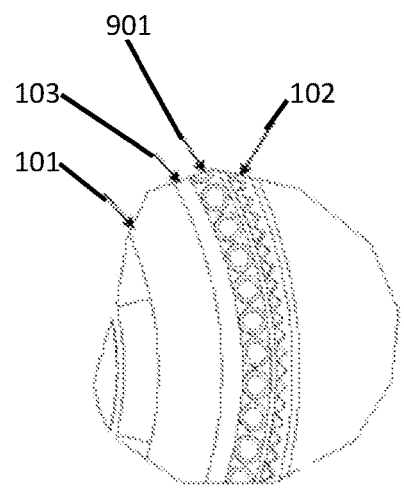
FIG. 7 is an enlarged view of the encircled portion of FIG. 4.

These and other advantages and features will become more apparent from the following description taken in conjunction with the drawings.

DETAILED DESCRIPTION

As will be described below, a universal method of developing teeth on a circular gear and a flex spline of a harmonic actuator to increase a number of teeth that are in contact and to reduce friction due to mismatched teeth profiles is disclosed. In addition, an equation is provided to control a pitch diameter of the circular gear and a pitch diametode of the flex spline for improving the development of the teeth on the circular gear and the flex spline. On the circular gear, the pitch diameter corresponds to a normal definition of pitch diameter. On the flex spline, the pitch diametode is referred to only in the free state of the flex spline since, following assembly, the flex spline is deformed into a shape with major and minor axes. The pitch diametode in this case thus refers to a perimeter length of the flex spline.

With reference to FIGS. 1-7, a compound harmonic actuator 100 is provided. The compound harmonic actuator 100 includes a motor 101, a flex spline 102 and a wave generator 103. The motor 101 includes an interior stator with windings that are receptive of current and a rotor disposed about the interior stators. The rotor includes a circumferential array of magnets such that, when current is supplied to the windings via wiring 1010, a flux moment is induced in the rotor which causes the rotor to rotate. This rotary motion serves to drive corresponding rotations of the wave generator 103. The flex spline 102 is disposed about the motor 101 with the wave generator 103 radially interposable between the motor 101 and the flex spline 102. The wave generator 103 is rotatably drivable by the motor 101 as noted above and is shaped to form the flex spline 102 into an elliptical shape 201 with a major axis 202 (see FIG. 2) or into an irregular elliptical shape 301 with multiple major axes 302 (see FIG. 3). The rotational driving of the wave generator 103 drives corresponding rotations of the major axis 202 or the major axes 302 of the flex spline 102.

The flex spline 102 has a number of external teeth that can interface with a number of internal teeth of an output gear, an output arm or a coupling as will be described below. Since the number of the external teeth of the flex spline 102 is different than the number of internal teeth of the output gear, the output arm or the coupling, the rotations of the major axis 202 of the major axes 302 of the flex spline 102 drive corresponding (reverse) and geared-down rotations of the output gear, the output arm or the coupling.

The compound harmonic actuator 100 may further include one or more ground arms 104 and an output arm 105. The motor 101 is supportively disposable within the one or more ground arms 104 and the output arm is drivable by the flex spline 102 to pivot within a predefined range of angles relative to the one or more ground arms 104. In some cases, the compound harmonic actuator 100 may be employed to control certain surfaces of a wing of an aircraft where a relatively large amount of torque is required to pivot an aerodynamic surface relative to another aerodynamic surface. For example, the one or more ground arms 104 may be affixed to an aircraft wing spar and the output arm 105 may be affixed to an aileron of the aircraft wing. In such cases, as the output arm 105 pivots relative to the one or more ground arms 104, the aileron correspondingly pivots relative to the spar. The angular range of such pivoting is limited by software which prevents an over rotation in either direction of the motor 101 and by mechanical features (e.g., the guide 106 of the output arm 105 and the boss 107 of the one or more ground arms 104 which moves through the guide 106 during pivoting).

With reference to FIG. 8, a method of developing a flex spline and circular gear tooth profile for a harmonic actuator as described above is provided. As shown in FIG. 8, the method includes defining circular gear and flex spline centroids based on gear ratio calculations which are, in turn, based on respective numbers of the teeth of the circular gear and the flex spline (block 8001), finding mid-points between the centroids of the circular gear and the centroids of the flex spline (block 8002) and transforming the mid-points into a mapping of the tooth profile for respective teeth of the circular gear and the flex spline (block 8003).

In accordance with embodiments, the transforming of the mid-points into the mapping of the tooth profile may include connecting the mid-points in the mapping to generate a curve with the method further including transforming the curve symmetrically.

Figure 10:
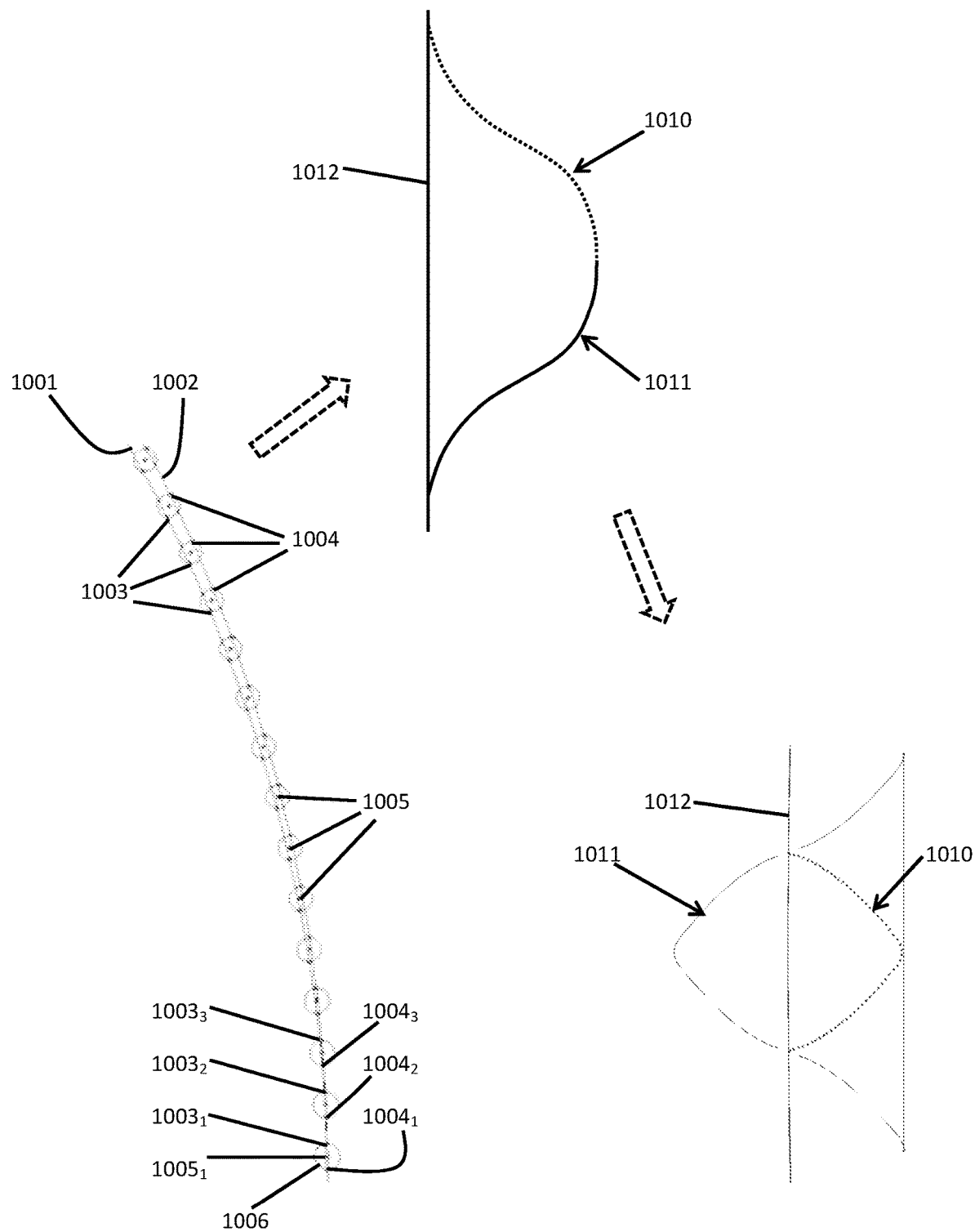
FIG. 10 is a graphical illustration of operations of the method of FIG. 9 in accordance with embodiments.

With reference to FIGS. 9 and 10, a method of developing a tooth profile for respective teeth of a flex spline and a circular gear of a harmonic actuator is provided. The method includes generating a lobe-to-lobe segment of a flex spline curve 1001 having a pitch diametode of the flex spline (block 9001). Here, the pitch diametode is defined as the "pitch diameter" of the flex spline or the length of the flex spline if it were laid out in a straight line. The method further includes generating a lobe-to-lobe segment of a circular gear curve 1002 having a pitch diameter of the circular gear (block 9002) and aligning corresponding ends of lobe-to-lobe segments of the flex spline curve 1001 and the circular gear curve 1002 so that the flex spline curve 1001 runs along a corresponding length of the circular gear curve 1002, diverges from the circular gear curve 1002 with increasing distance from an original proximal lobe and converges toward the circular gear curve 1002 with decreasing distance from a next proximal lobe (block 9003).

In accordance with embodiments, the pitch diameter of the circular gear and the pitch diametode of the flex spline are assumed at least initially based on expected or estimated values thereof and historical data. As will be noted below, however, at least one or both of the pitch diameter and the pitch diametode can be adjusted in an event the tooth profile being developed is determined to be inaccurate.

In accordance with further embodiments, the flex spline may be operably disposable inside or outside the circular gear. In the former case, the pitch diametode may be set to be equal to the pitch diameter of the circular gear multiplied and divided by the numbers of teeth of the flex spline and the circular gear, respectively. In the latter case, the pitch diametode may be set to be equal to the pitch diameter of the circular gear multiplied and divided by the numbers of teeth of the circular gear and the flex spline, respectively.

As shown in FIG. 10, the flex spline being considered is a two-lobe flex spline. This means that the flex spline is elliptical and makes interfacing contact with the circular gear at two lobes that are 180 degrees apart. While only about 60 of those degrees are shown in FIG. 10, the divergence of the flex spline curve 1001 from the circular gear curve 1002 is illustrated and it will be understood that the divergence reaches its maximum at 90 degrees whereupon the flex spline curve 1001 begins to converge toward the circular gear curve 1002. It will be further understood that, with the flex spline being a two-lobe flex spline, the flex spline will have one less tooth than the circular gear and thus provide for a gear ratio or differential of the corresponding harmonic actuator. That is, respective numbers of the teeth of the flex spline and the circular gear are based on a number of lobes of the flex spline.

The method further includes defining locations of centroids 1003 of each of the teeth of the flex spline along the lobe-to-lobe segment of the flex spline curve 1001 and defining locations of centroids 1004 of each of the teeth of the circular gear along the lobe-to-lobe segments of the circular gear curve 1002 (block 9004). Here, the defining of the locations may include setting an initial location of a first one of the centroids $1004_1$ of the teeth of the circular gear at a zero degree point (i.e., the proximal lobe where the corresponding ends of the flex spline curve 1001 and the circular gear curve 1002 align or meet), finding a location of a second centroid $1004_2$ of the teeth of the circular gear which neighbors the first centroid $1004_1$ and setting an initial location of a first one of the centroids $1003_1$ of the teeth of the flex spline gear halfway between the locations of the first and second centroids $1004_1$ and $1004_2$ of the teeth of the circular gear. This will position the centroids 1003 and 1004 of each of the teeth of the flex spline and the circular gear to interface rather than interfere with one another and should result in a similar arrangement of centroids 1003 and 1004 at the next lobe.

The method further includes finding mid-points 1005, which are configured as arranged to be mapped into the tooth profile, between the locations of corresponding pairs of the centroids 1003 and 1004 of each of the teeth of the flex spline and the circular gear (block 9005). Here, for the first centroids $1003_1$ and $1004_1$, the finding of a mid-point $1005_1$ may include drawing a smallest circle 1006 possible which intersects with both of the first centroids $1003_1$ and $1004_1$ and then identifying the radial center of the circle 1006 as the mid-point $1005_1$.

At this point, the set of mid-points 1005 are mathematically transformed so as to be mapped into the tooth profile 1010 for the flex spline or the circular gear (block 9006) and the set of found mid-points 1005 are connected to generate a symmetrically transformable curve 1011 (block 9007). In the former case, the set of mid-points 1005 are mathematically transformed so as to be mapped into the tooth profile for the flex spline and connected to generate a flex spline tooth curve and the flex spline tooth curve is symmetrically transformed in the corresponding direction to generate a complementary circular gear tooth curve (block 90081). In the latter case, the set of mid-points 1005 are mathematically transformed so as to be mapped into the tooth profile for the circular gear and connected to generate a circular gear tooth curve and the circular gear tooth curve is symmetrically transformed in the corresponding direction to generate a complementary flex spline tooth curve (block 90082).

In accordance with embodiments, the mathematical transformation of the set of mid-points 1005 for the mapping may include placing a first one of the mid-points 1005 on a vertical axis 1012, measuring distances between the second or adjacent mid-point 1005 in transverse (e.g., vertical and horizontal) directions and then placing the second one of the mid-points 1005 on the vertical axis relative to the first in accordance with the measured distances.

In accordance with embodiments, the method may further include an analysis of results of the mapping of the found mid-points 1005 into the tooth profile 1010 (block 9009), an adjustment or a setting of at least one of the pitch diametode of the flex spline and the pitch diameter of the circular gear (block 9010) in accordance with a result of the analysis and a repetition of at least the generating operations (blocks 9001 and 9002), the aligning operation (block 903), the defining operation (block 9004) and the finding operation (block 9005).

In accordance with embodiments, at least a plurality of the teeth of the flex spline and the circular gear fit perfectly with each other (as used herein, the perfect fit is defined with a tolerance of 1/10,000 of an inch). In accordance with further embodiments, where the pitch diametode of the flex spline is determined based on the pitch diameter of the circular gear and the ratio of the numbers of teeth of the flex spline and the circular gear, all of the teeth of the flex spline and all of the teeth of the circular gear fit perfectly with each other (again, as used herein, the perfect fit is defined with a tolerance of 1/10,000 of an inch).

This invention described herein provides for a repeatable methodology of developing teeth profiles on the circular gear and flex spline of a harmonic actuator and can be used universally for any number of contacts, any diameter and any number of teeth. The invention also provides for universal development of the pitch diameter of the circular gear and the pitch diametode of the flex spline to thereby improve a meshing accuracy.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of developing a tooth profile for respective teeth of a flex spline and a circular gear of a harmonic actuator, the method comprising:
   generating a lobe-to-lobe segment of a flex spline curve having a pitch diametode of the flex spline;
   generating a lobe-to-lobe segment of a circular gear curve having a pitch diameter of the circular gear;
   aligning corresponding ends of lobe-to-lobe segments of the flex spline curve and the circular gear curve;
   defining locations of centroids of each of the teeth of the flex spline and the circular gear along the lobe-to-lobe segments of the flex spline curve and the circular gear curve, respectively; and
   finding mid-points for mapping into the tooth profile between the locations of corresponding pairs of the centroids of each of the teeth of the flex spline and the circular gear.

2. The method according to claim 1, wherein respective numbers of the teeth of the flex spline and the circular gear are based on a number of flex spline lobes.

3. The method according to claim 1, further comprising:
   analyzing results of a mapping of the found mid-points into the tooth profile;
   adjusting at least one of the pitch diametode of the flex spline and the pitch diameter of the circular gear; and
   repeating the generating operations, the aligning operation, the defining operation and the finding operation.

4. The method according to claim 1, further comprising connecting a mapping of the found mid-points to generate a curve of the tooth profile.

5. The method according to claim 4, further comprising symmetrically transforming the mid-points of the curve into the mapping of the tooth profile by connecting the mid-points in the mapping.

6. The method according to claim 1, wherein the flex spline is operably disposable inside the circular gear, the method further comprising setting the pitch diametode equal to the pitch diameter of the circular gear multiplied and divided by the numbers of teeth of the flex spline and the circular gear, respectively.

7. The method according to claim 1, wherein the method further comprises setting the pitch diametode equal to the pitch diameter of the circular gear multiplied and divided by the numbers of teeth of the circular gear and the flex spline, respectively.

8. A harmonic actuator, comprising:
   a circular gear having a pitch diameter and a first number of first teeth; and
   a flex spline having a pitch diametode and a second number of second teeth which interface with the first number of the first teeth gear during rotational operations,
   wherein:
   the first and second numbers of the first and second teeth, respectively, are different,
   each of the first and second teeth has a tooth profile which is developed based on a mapping of midpoints between locations of centroids of the first teeth along a circular gear curve having the pitch diameter and locations of centroids of the second teeth along a flex spline gear curve having the pitch diametode.

9. The harmonic actuator according to claim 8, wherein the first and second numbers are based on a number of flex spline lobes.

10. The harmonic actuator according to claim 8, wherein a plurality of the first teeth fit with a plurality of the second teeth.

11. The harmonic actuator according to claim 8, wherein a plurality of the first teeth fit with a plurality of the second teeth with a tolerance of 1/10,000 of an inch.

12. The harmonic actuator according to claim 8, wherein the flex spline is operably disposable inside or outside the circular gear.

13. The harmonic actuator according to claim 12, wherein the pitch diametode is equal to the pitch diameter of the circular gear multiplied and divided by the second and first numbers, respectively, where the flex spline is operably disposable inside the circular gear.

14. The harmonic actuator according to claim 8, wherein the pitch diametode is equal to the pitch diameter of the circular gear multiplied and divided by the first and second numbers, respectively.

15. The harmonic actuator according to claim 8, wherein all of the first teeth fit with all of the second teeth.

16. The harmonic actuator according to claim 8, wherein all of the first teeth fit with all of the second teeth with a tolerance of 1/10,000 of an inch.

* * * * *